US006573617B2

(12) United States Patent
Jones et al.

(10) Patent No.: US 6,573,617 B2
(45) Date of Patent: *Jun. 3, 2003

(54) MODULAR POWER STRIP

(75) Inventors: Christopher R. Jones, Oak Lawn, IL (US); Howard L. Danzyger, Aurora, IL (US); James T. Weisburn, Massillon, OH (US); James W. Beile, Arlington Heights, IL (US); Karenann Brow, Elgin, IL (US); James F. Caruso, Evanston, IL (US)

(73) Assignee: Fellowes Manufacturing Company, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/911,232

(22) Filed: Jul. 23, 2001

(65) Prior Publication Data

US 2001/0040409 A1 Nov. 15, 2001

Related U.S. Application Data

(63) Continuation-in-part of application No. 09/310,062, filed on May 11, 1999, now Pat. No. 6,410,994.

(51) Int. Cl.$^7$ .................................................. H02J 1/00

(52) U.S. Cl. ............................ 307/36; 307/11; 307/42; 439/369; 439/501; 439/717

(58) Field of Search .............................. 307/36, 11, 42, 307/29, 147, 18, 155, 38, 156; 439/367–369, 460, 501, 731, 715, 717, 723, 724

(56) References Cited

U.S. PATENT DOCUMENTS

| | | | |
|---|---|---|---|
| 2,231,001 | A | 2/1941 | Engstrom |
| 2,351,379 | A | 6/1944 | Wehringer |
| 2,502,658 | A | 4/1950 | Lindmark |
| 2,536,776 | A | 1/1951 | Smellie |
| 2,561,556 | A | 7/1951 | Bell |
| 2,574,992 | A | 11/1951 | Webster |
| 3,042,337 | A | 7/1962 | Dinneen |
| 3,213,185 | A | 10/1965 | Petrick |
| 3,289,260 | A | 12/1966 | Buscall, Jr. |
| 3,290,453 | A | 12/1966 | Jensen |
| 3,646,684 | A | 3/1972 | Paulsen |
| 4,095,871 | A | 6/1978 | Holte |
| 4,123,012 | A | 10/1978 | Hough |
| 4,177,961 | A | 12/1979 | Gruenewald |
| 4,395,640 | A | 7/1983 | Bone |
| D270,629 | S | 9/1983 | Drew |
| 4,500,150 | A | 2/1985 | Leibensperger et al. |
| 4,520,239 | A | 5/1985 | Schwartz |
| D285,065 | S | 8/1986 | Bobrovniczky |
| D285,435 | S | 9/1986 | Hoehne |
| 4,687,154 | A | 8/1987 | Deweese |
| 4,717,350 | A | 1/1988 | Lax |
| D294,487 | S | 3/1988 | Bannigan |
| 4,778,125 | A | 10/1988 | Hu |
| 4,867,701 | A | 9/1989 | Wiand |
| 5,071,367 | A | 12/1991 | Luu |
| D327,873 | S | 7/1992 | Luu |
| 5,157,273 | A | 10/1992 | Medendorp et al. |
| 5,234,360 | A | 8/1993 | Kramer, Jr. |

(List continued on next page.)

*Primary Examiner*—Fritz Fleming
(74) *Attorney, Agent, or Firm*—Brinks Hofer Gilson & Lione; Gregory H. Zayia

(57) ABSTRACT

A power strip is described which includes a first unit containing a connecting member and an electrical outlet, wherein the first unit is electrically connected to a plug; and (b) a second unit electrically connected to the first unit, the second unit containing an electrical outlet and a complementary connecting member that is complementary to the connecting member of the first unit, wherein the second unit is removably attached to the first unit by cooperation of the connecting member of the first unit and the connecting member of the second unit.

21 Claims, 5 Drawing Sheets

U.S. PATENT DOCUMENTS 5,236,371 A 8/1993 Matthis
5,236,374 A 8/1993 Leonard et al.
D342,055 S 12/1993 Wakefield
5,292,257 A 3/1994 Milan
D349,885 S 8/1994 Lee
5,334,033 A 8/1994 Milan
D350,916 S 9/1994 Rossman et al.
D350,917 S 9/1994 Rossman et al.
D350,939 S 9/1994 Rossman et al.
D350,940 S 9/1994 Rossman et al.
D352,273 S 11/1994 Fladung
D356,294 S 3/1995 Fladung
5,424,903 A 6/1995 Schreiber
5,430,598 A 7/1995 Rodolfo et al.
5,439,390 A 8/1995 Raynor et al.
D362,229 S 9/1995 Moses
5,457,600 A 10/1995 Campbell et al.
D366,865 S 2/1996 Stringer
D368,467 S 4/1996 Parshad
D368,893 S 4/1996 Harwood et al.
D369,784 S 5/1996 Pogue et al.
D370,458 S 6/1996 Fladung et al.
5,547,393 A 8/1996 Jansen
5,562,488 A 10/1996 Neiser et al.
5,596,479 A 1/1997 Campbell et al.
5,629,826 A 5/1997 Roca et al.
D381,316 S 7/1997 Yu
D382,855 S 8/1997 Salmond et al.
5,658,158 A 8/1997 Milan
5,700,150 A 12/1997 Morin
5,700,158 A 12/1997 Neiser et al.
5,708,554 A 1/1998 Liner
5,721,934 A 2/1998 Scheurich
5,738,548 A 4/1998 Rutulante
5,748,430 A 5/1998 Bird
5,780,775 A 7/1998 Yu
5,902,148 A 5/1999 O'Rourke
5,931,702 A 8/1999 Fladung
5,957,701 A 9/1999 McMillin
6,410,994 B1 * 6/2002 Jones et al. .................. 307/11

* cited by examiner

MODULAR POWER STRIP

RELATED APPLICATION

This application is a continuation-in-part of application Ser. No. 09/310,062 filed May 11, 1999, now U.S. Pat. No. 6,410,994 B1 (Jun. 25, 2002), the entire contents of which are incorporated herein by reference, except that in the event of any inconsistent disclosure or definition from the present application, the disclosure or definition herein shall be deemed to prevail.

BACKGROUND

The present invention relates to power strips and, more particularly, to power strips of a modular nature, whereby electrical power may be provided for various types of electrical devices and/or connections, including but not limited to power supply cords, incoming telephone lines, cable TV protection using coaxial connections, local area networks (LAN's), and wide area networks (WAN's).

More particularly, the present invention relates to power strips having multiple modules, and surge protection capability. In modern homes and offices, it is convenient to use a single power strip for multiple electrical appliances or electrical lines. Unfortunately, in the typical office or home, because such appliances and electrical lines are located by necessity or choice at different locations remote from other such appliances or lines, it often becomes necessary to employ more than one power strip in a single room, or use one or more extension cords running from the various appliances to a single power strip. When multiple power strips are used or electrical extension is required, the presence of the additional power strips and/or extension cords often contributes to an unsightly appearance and may result in a safety hazard if not carefully placed so as to avoid pedestrian traffic and the like.

In addition, electrical lines, such as AC power lines, telephone lines, data lines and coaxial cable lines are subject to accidental power surges. These power surges are a condition wherein an abnormally high current and/or voltage is transmitted over the electrical line. Power surges can be caused by lightning or short circuits. The surge can cause permanent damage to devices connected to the electrical line.

Therefore, surge protectors have been developed to detect surges and to block the surge before it reaches devices on the electrical line. Generally, surge protectors are divided into two different types: primary and secondary.

Primary surge protectors are generally located where electrical lines enter a building and are designed with a relatively large "surge capacity" so that they can protect against relatively large surges. Secondary surge protectors, on the other hand, are generally located on the inside of a building. It is common to place a secondary surge protector on an AC power line between a wall outlet and a computer, or other electrical appliance. In addition, primary and secondary surge protectors are further divided into surge protectors for each type of electrical line. The various types of electrical lines have different constructions, different kinds of interfacing hardware and are subject to different types of surges. Furthermore, the various types of electrical lines typically follow different paths within a building. For instance, telephone lines run to telephone jacks, while AC power lines run to power outlets.

The present invention is directed to power strips which can be employed at remote locations while avoiding the aforementioned drawbacks including unsightly appearances and safety hazards, and which can provide secondary surge protection to appliances and the like to which they are electrically connected.

SUMMARY

The scope of the present invention is defined solely by the appended claims, and is not affected to any degree by the statements within this summary.

Briefly stated, a first modular power strip embodying features of the present invention includes (a) a first unit comprising a connecting member and an electrical outlet, wherein the first unit is electrically connected to a plug; and (b) a second unit electrically connected to the first unit, the second unit comprising an electrical outlet and a complementary connecting member that is complementary to the connecting member of the first unit, wherein the second unit is removably attached to the first unit by cooperation of the connecting member of the first unit and the complementary connecting member of the second unit. The connecting member is preferably selected from the group consisting of a tongue, a groove, a stud, a socket, a magnet, a hook, a loop, an adhesive, a VELCRO hook fabric fastener, a VELCRO loop fabric fastener, a screw, a screwhole, and combinations thereof.

A second modular power strip embodying features of the present invention includes (a) a first unit comprising an electrical outlet, and means for connecting, wherein the first unit is electrically connected to a plug; and (b) a second unit electrically connected to the first unit, the second unit comprising an electrical outlet and means for receiving, wherein the second unit is removably attached to the first unit by cooperation of the connecting means of the first unit and the receiving means of the second unit.

A third modular power strip embodying features of the present invention includes (a) a first unit comprising a connecting member selected from the group consisting of a tongue, a groove, a stud, a socket, a magnet, a hook, a loop, an adhesive, a VELCRO hook fabric fastener, a VELCRO loop fabric fastener, a screw, a screwhole, and combinations thereof, and an electrical outlet, wherein the first unit is electrically connected to a plug; (b) a second unit electrically connected to the first unit, the second unit comprising an electrical outlet and a complementary connecting member that is complementary to the connecting member of the first unit, wherein the second unit is removably attached to the first unit by cooperation of the connecting member of the first unit and the complementary connecting member of the second unit; and (c) a surge protector electrically coupled to the plug.

A fourth modular power strip embodying features of the present invention includes (a) a first unit comprising an electrical outlet, and means for connecting, wherein the first unit is electrically connected to a plug; (b) a second unit electrically connected to the first unit, the second unit comprising an electrical outlet and means for receiving, wherein the second unit is removably attached to the first unit by cooperation of the connecting means of the first unit and the receiving means of the second unit; and (c) a surge protector electrically coupled to the plug.

The presently preferred embodiments described herein may fulfill one or more objects, which can include but are but not limited to: providing a power strip having multiple modules; providing a power strip having multiple modules that can be placed at different locations to accommodate numerous and various electrical appliances and electrical lines; providing a power strip having multiple modules in which the multiple modules are electrically connected (e.g., by a cord) to accommodate variable distances between remote appliances or electrical lines; and providing a modular power strip affording secondary surge protection, and having multiple modules capable of being placed at different locations to accommodate numerous and various electrical appliances and electrical lines.

DETAILED DESCRIPTION OF THE PRESENTLY PREFERRED EMBODIMENTS

Figure 1:
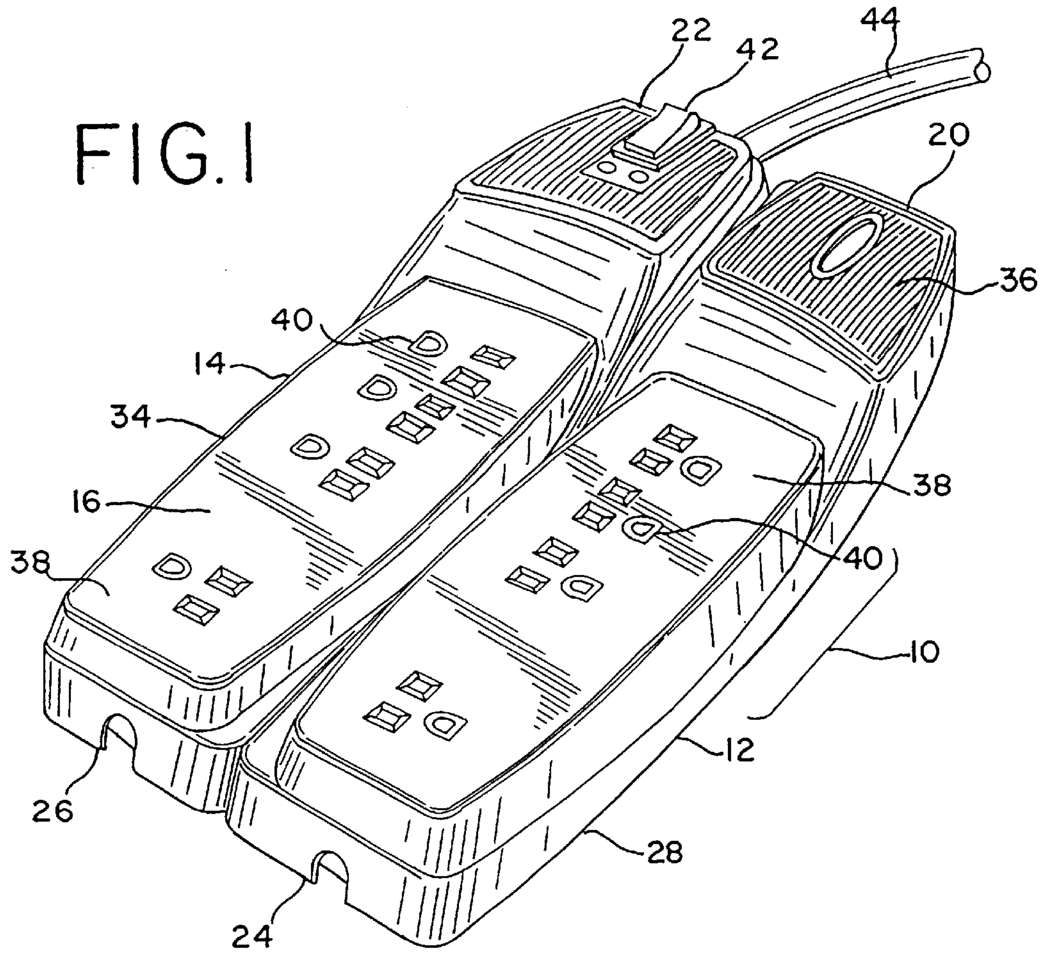
FIG. 1 is a perspective view of a modular power strip with the two modules connected to form an integrated housing.
Figure 6:
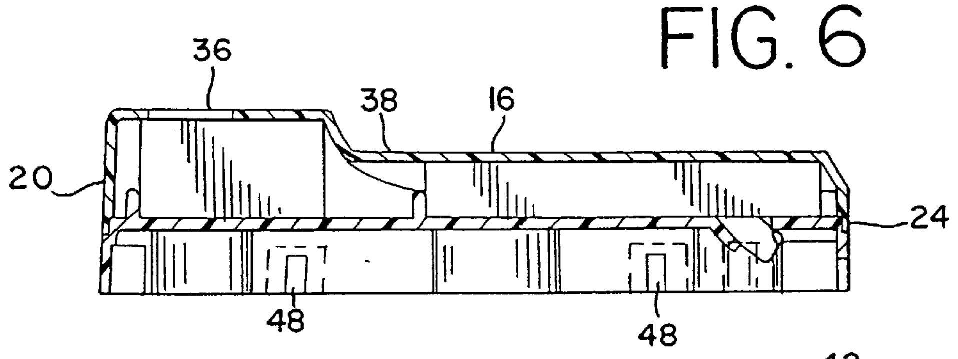
FIG. 6 is a side elevation of one module of the power strip of FIG. 2.
Figure 7:
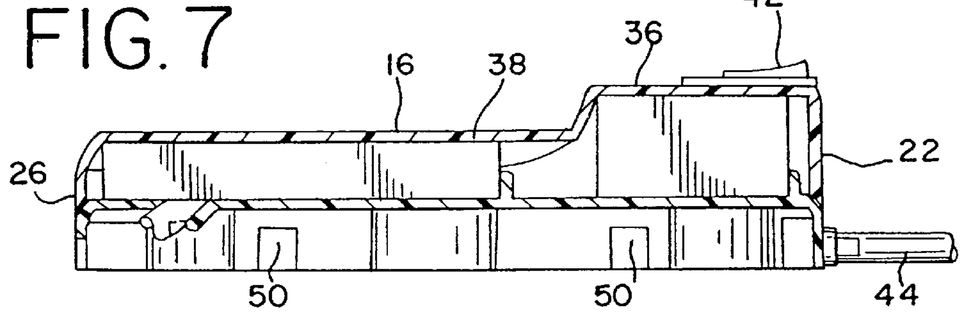
FIG. 7 is a side elevation of another module of the power strip of FIG. 2.

A modular power strip in accordance with the present invention, generally designated by the numeral 10, is shown in FIGS. 1–13.

The modular power strip 10 as shown in the drawings comprises a first 12 and a second 14 power supply module that can be removably and, preferably, matingly connected to one another. The modules 12 and 14 are generally elongated and are formed of any rigid material such as plastic, metal, ceramic, wood, and the like, and combinations thereof.

First and second modules 12 and 14 generally comprise an upper surface 16, a generally hollow underside 18, first ends 20 and 22, second ends 24 and 26, first elongated sides 28 and 30, and second elongated sides 32 and 34. The elongated sides extend substantially parallel to each other and substantially perpendicular to the first and second ends of each module. The upper surface 16 of the first 12 and second 14 modules preferably has a raised portion 36 at the first ends 20 and 22, and a depressed portion 38 extending from the raised portion 36 to the second ends 24 and 26. The depressed portion 38 of the upper surface 16 of the modules is shown to include one or more electrical outlets 40. In preferred embodiments, the upper surface 16 of the raised portion 36 of module 14 includes a switch 42 and an electrical cord 44 extending from the first end 22 of the second module 14 having a plug (not shown) for connection to a power supply, including a wall outlet, an extension cord, generator, power strip, and the like. The switch 42 controls the flow of electrical power from the electrical cord 44 to the switched electrical outlets 40 so that power can be switched either on or off.

A second cord 46 extends from the underside of the second end 24 of the first module 12 to the second end 26 of the second module 14 to allow electrical current to flow from the electrical outlet through the first 12 and second 14 modules. If additional modules are desired or needed, a third cord (not shown) may extend from the first end 22 of the second module 14 to connect with the first end of the third module to provide electrical current to the third module (not shown). Additional modules and cords may be connected as needed or desired in accordance with the description set forth herein. The length of the second cord 46 or any additional cords (not shown) needed or desired is limited only by consumer preference.

In alternative embodiments, one of the modules is equipped with a wall-mounting apparatus (not shown) allowing the module to be mounted on a wall and directly plugged into a wall outlet, thereby eliminating the need for a first cord for such electrical connection.

In a preferred embodiment, the modular power strip 10 of the present invention comprises two separate modules 12 and 14 connected by a cord 46 preferably four feet in length. It is to be understood, however, that the length of the cord may be any suitable length. When surge protection and/or electrical connection to the power strip is required at locations remote from one another, the modules 12 and 14 can be disconnected and separated from one another and placed at remote locations as necessary or desired. The distance from which one module can be placed from the other module is limited only by the length of the cord extending between two or more modules.

In preferred embodiments, power strips in accord with the present invention include a surge protector to defend against overcurrent conditions. Two broad categories of surge protectors which can be used in accord with the present invention include fuses and positive-temperature-coefficient (PTC) devices. Preferred surge protectors include but are not limited to: single-use melting-metal fuses, self-resetting polymer-based PTC devices, self-resetting ceramic PTC devices, metal-oxide varistors (MOVs) including zinc-oxide ceramic semiconductor structures, zener diodes, thyristor-based clamping structures, and the like, and combinations thereof.

When a power strip is needed at a single location, the modules 12 and 14 of the present invention can be removably connected to form a single unit. Preferably, each module is connected along one or more of their elongated sides by the agency of one or more connecting members. Preferably, the connecting members of a pair of modules to be connected are complementary in configuration, such that the cooperation of the connecting member on the first module and the complementary connecting member on the second module will result in the first and second modules being removably attached. Suitable connectors include but are not limited to: tab-and-aperture fasteners, tongue-and-groove fasteners, snap fasteners, magnets, hook-and-loop fasteners, adhesives, hook-and-loop fabric fasteners sold under the tradename VELCRO, screw-and-screwhole fasteners, and the like, and combinations thereof.

In a first preferred embodiment shown in FIGS. 1–7, the second elongated side 32 of the first module 12 has at least one tab 48 protruding outwardly therefrom, which engages one or more apertures 50 in the first elongated side 30 of the second module 14. When connected, as shown in FIG. 1, the first and second modules 12 and 14 form a single unit that may be used as a single power strip at a single location. Similarly, an additional module may be connected to the second elongated side 34 of the second module 14 and so forth.

Figure 8:
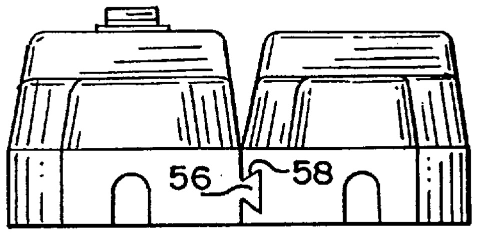
FIG. 8 is an end view of a second power strip embodying features of the present invention.

In a second preferred embodiment shown in FIG. 8, the second elongated side 32 of the first module 12 has at least one tongue 56 attached thereto, which slidingly engages at least one groove 58 on the first elongated side 30 of the second module 14. An additional module may be connected to the second elongated side 34 of the second module 14 and so forth.

Figure 9:
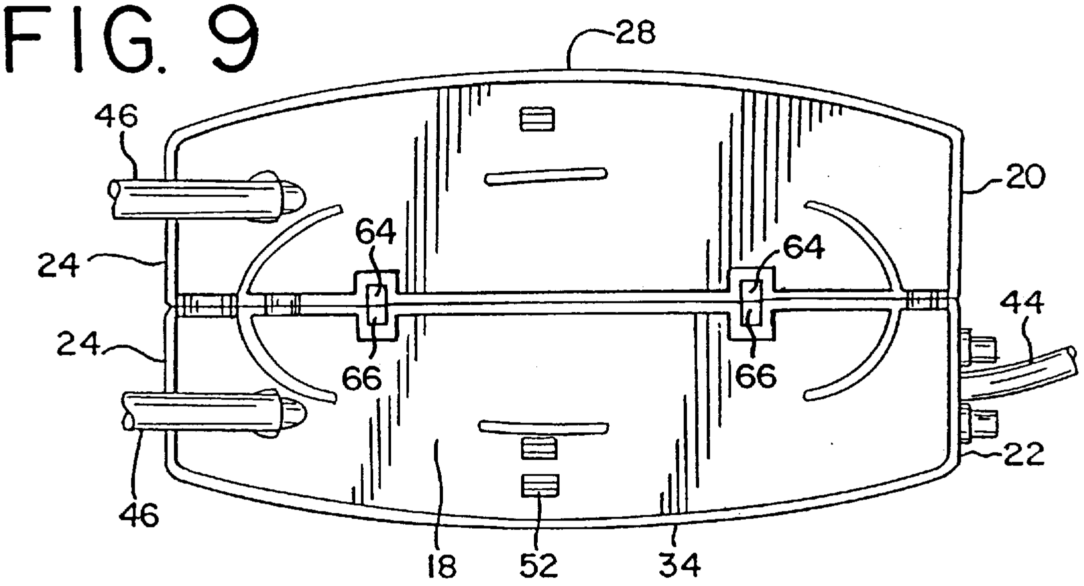
FIG. 9 is a view of the underside of a third power strip embodying features of the present invention.

In a third preferred embodiment shown in FIG. 9, the second elongated side 32 of the first module 12 has at least one magnetic surface 64 attached thereto, which magnetically attracts and engages at least one magnetic surface 66 on the first elongated side 30 of the second module 14, wherein the two magnetic surfaces 64 and 66 have opposite poles. An additional module may be connected to the second elongated side 34 of the second module 14 and so forth.

Figure 10:
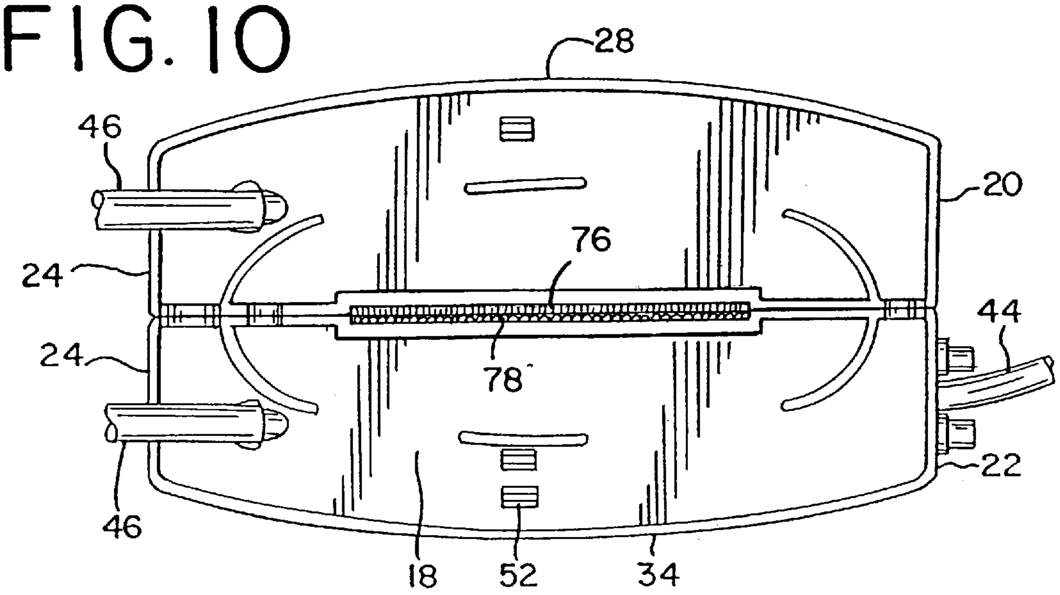
FIG. 10 is a view of the underside of a fourth power strip embodying features of the present invention.

In a fourth preferred embodiment shown in FIG. 10, the second elongated side 32 of the first module 12 has at least one VELCRO hook fabric surface 76 attached thereto, which stickingly engages at least one VELCRO loop fabric surface 78 on the first elongated side 30 of the second module 14. An additional module may be connected to the second elongated side 34 of the second module 14 and so forth.

Figure 11:
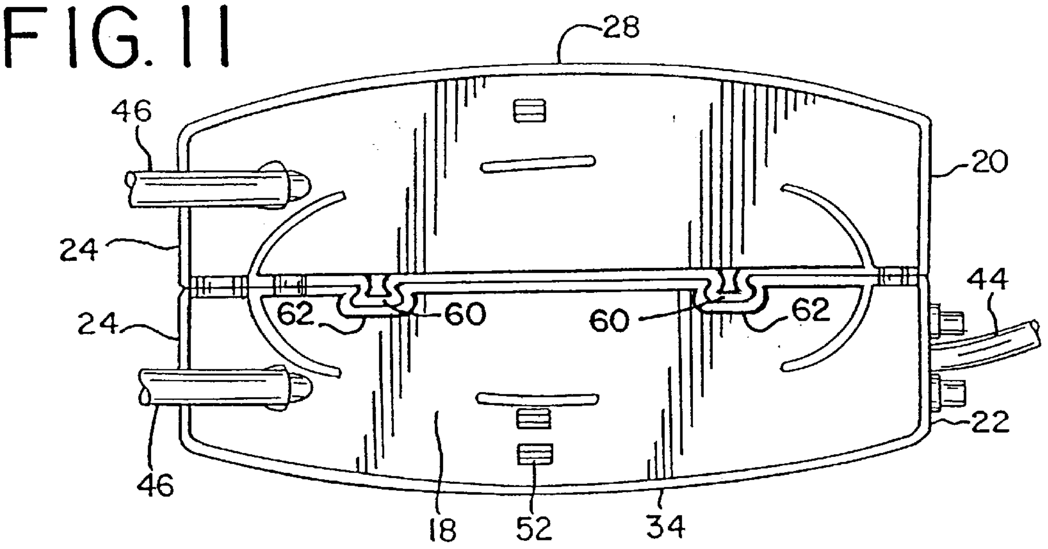
FIG. 11 is a view of the underside of a fifth power strip embodying features of the present invention.

In a fifth preferred embodiment shown in FIG. 11, the second elongated side 32 of the first module 12 has at least one stud 60 attached thereto, which snappingly engages at least one socket 62 on the first elongated side 30 of the second module 14. An additional module may be connected to the second elongated side 34 of the second module 14 and so forth.

Figure 12:
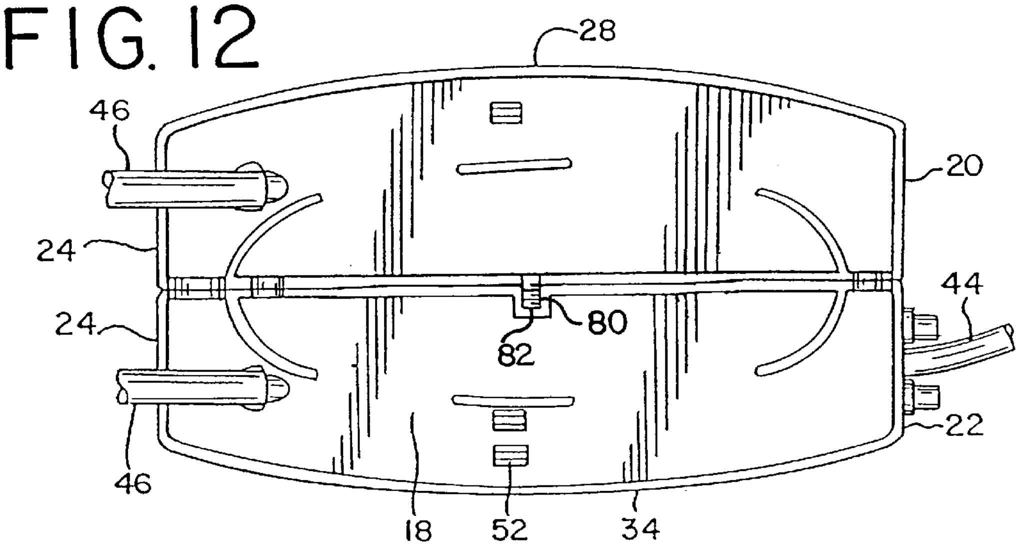
FIG. 12 is a view of the underside of a sixth power strip embodying features of the present invention.

In a sixth preferred embodiment shown in FIG. 12, the second elongated side 32 of the first module 12 has a screw projection 80 attached thereto, which engages a corresponding screwhole 82 on the first elongated side 30 of the second module 14. Preferably, the helical thread of screw projection 80, and the corresponding helical thread of screwhole 82, are selected such that the undersurface of first module 12 and the undersurface of second module 14 will lie in substantially the same plane when the modules are screwed together. An additional module may be connected to the second elongated side 34 of the second module 14 and so forth.

Figure 13:
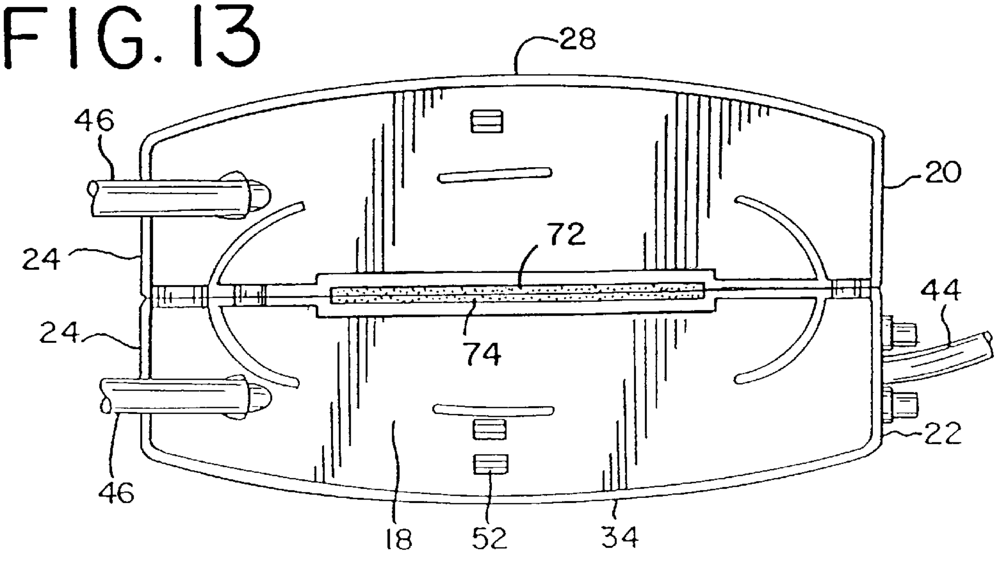
FIG. 13 is a view of the underside of a seventh power strip embodying features of the present invention.

In a seventh preferred embodiment shown in FIG. 13, the second elongated side 32 of the first module 12 has at least one adhesive surface 72 attached thereto, which engages at least receiving surface 74 on the first elongated side 30 of the second module 14. Receiving surface 74 may itself have an adhesive surface. Preferably, adhesives used in accord with this embodiment have long-lasting adhesive characteristics, which will not diminish appreciably even after numerous removable connections of modules 12 and 14. Likewise, it is preferred that adhesive surface 72 can be replaced or regenerated as necessary. Preferred adhesives include those referred to in the art as re-usable adhesives. An additional module may be connected to the second elongated side 34 of the second module 14 and so forth.

Figure 2:
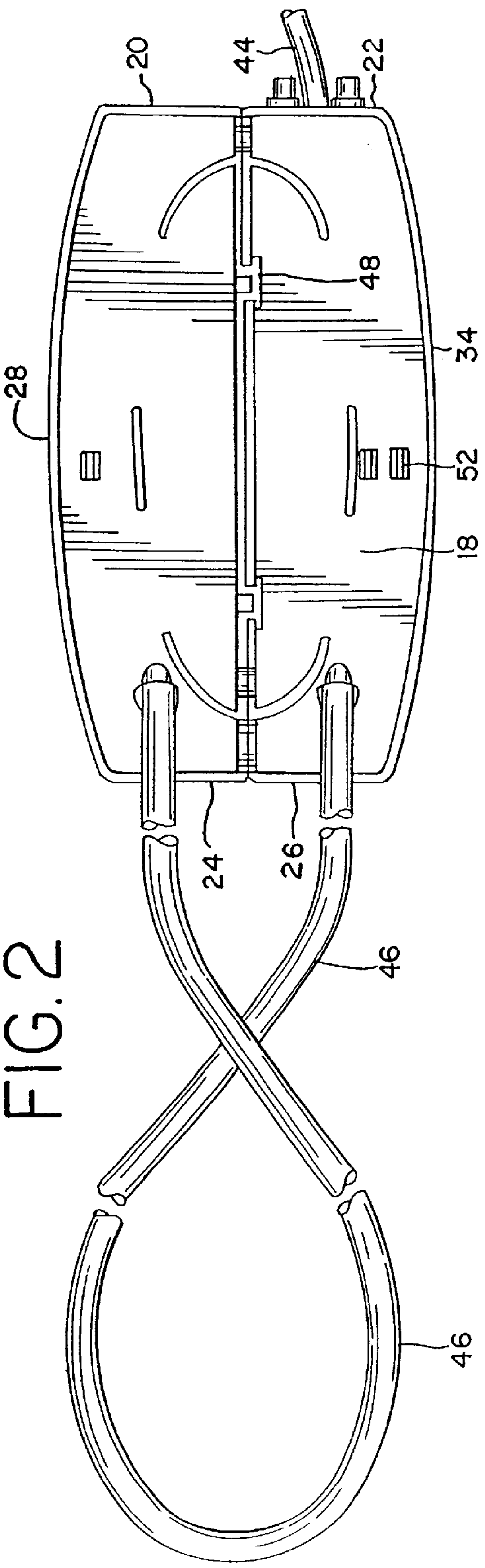
FIG. 2 is a view of the underside of a first power strip with the electrical cord placed outside of the housing.
Figure 3:
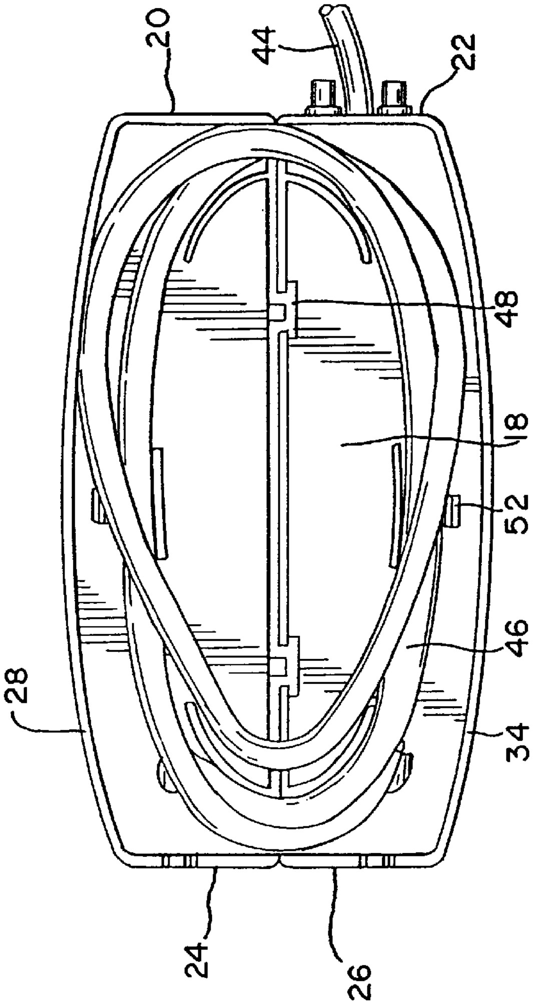
FIG. 3 is a view of the underside of the power strip of FIG. 2 with the electrical cord placed inside of the housing.
Figures 4, 5:
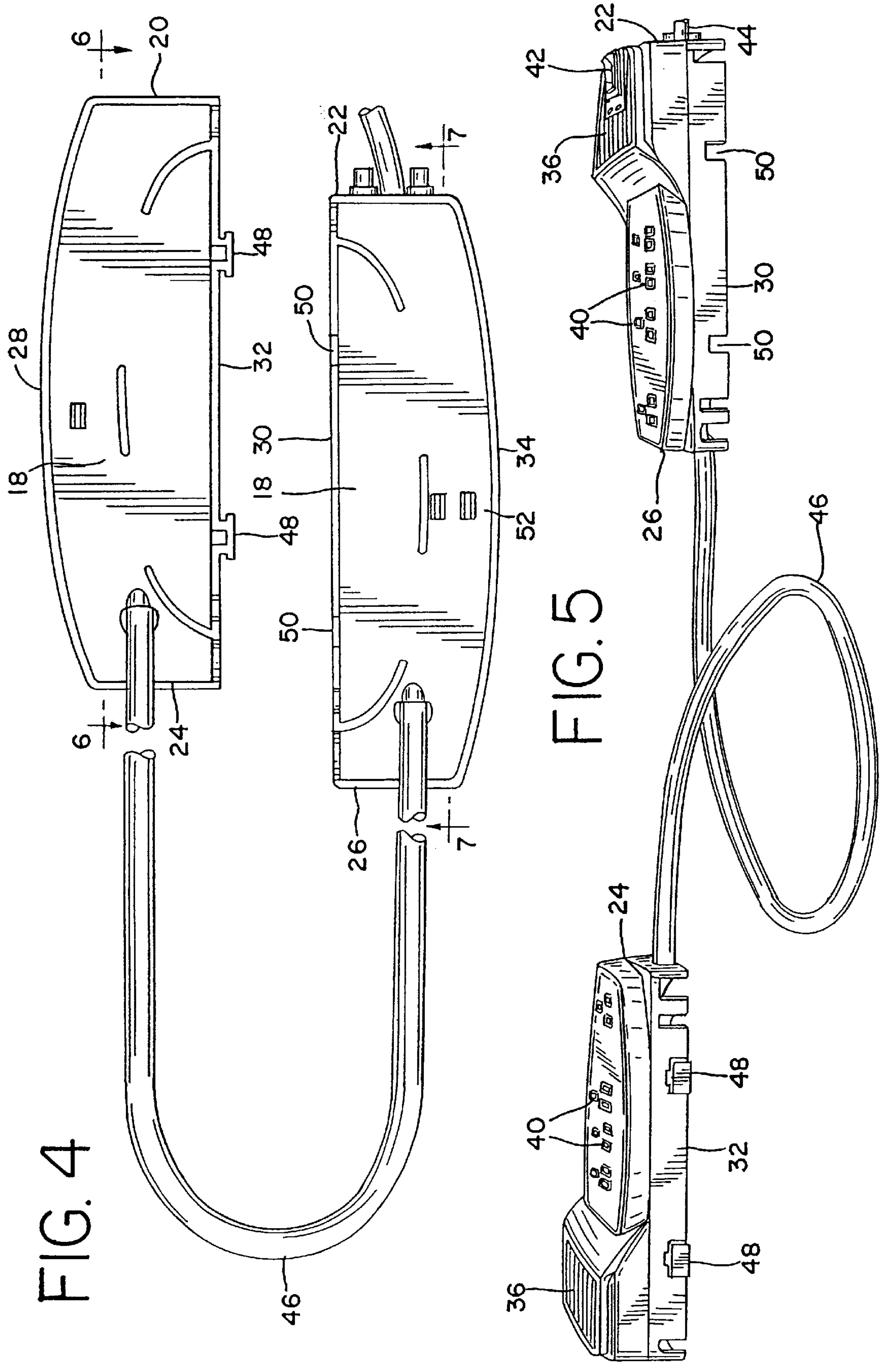
FIG. 4 is a view of the underside of the power strip of FIG. 2 with the two modules disconnected from one another.
FIG. 5 is a perspective view of the power strip of FIG. 2 with the two modules disconnected from one another.

As shown in FIG. 2 and 3, when modules 12 and 14 are united to form a single unit, the second cord 46 can be stored in the hollow underside 18 of the connected modules 12 and 14. In a preferred embodiment, as shown in FIG. 3, the second cord 46 may coiled by forming one or more loops 54 and retained in the generally hollow underside 18 of the connected modules by clips, clamps, straps, hooks, posts, or any combination thereof. In the preferred embodiment as shown in FIGS. 2 and 3, the second cord 46 is crossed upon itself one or more times to form a loop and the looped second cord is fitted into the generally hollow underside 18 of the united housing and held in place by one or more clamps 52.

Throughout this description and in the appended claims, it is to be understood that elements of the power strip referred to in the singular (e.g., a surge protector, a connecting member, a complementary connecting member, an electrical outlet, and the like), refer to one or a plurality of such elements, regardless of tense employed. Likewise, although the power strips illustrated in FIGS. 1–10 are represented as having only two modular units, it is to be understood that power strips in accord with the present invention may include more than two modular units, which are removably connected one to another with connecting members, in the manner described hereinabove.

The foregoing detailed description and drawings have been provided by way of explanation and illustration, and are not intended to limit the scope of the appended claims. Many variations in the presently preferred embodiments described and illustrated herein will be obvious to one of ordinary skill in the art, and remain within the scope of the appended claims and their equivalents.

What is claimed is:

1. A power strip comprising:

a first unit comprising a connecting member selected from the group consisting of a tongue, a groove, a stud, a socket, a magnet, a hook, a loop, an adhesive, a hook fabric fastener, a loop fabric fastener, a screw, a screwhole, and combinations thereof, and an electrical outlet, wherein the first unit is electrically connected to a plug; and a second unit electrically connected to the first unit, the second unit comprising an electrical outlet and a complementary connecting member that is complementary to the connecting member of the first unit, wherein the second unit is removably attached to the first unit by cooperation of the connecting member of the first unit and the complementary connecting member of the second unit.

2. The power strip of claim 1 wherein the first unit is electrically connected to the plug by an electrical cord.

3. The power strip of claim 1 wherein the second unit is electrically connected to the first unit by an electrical cord.

4. The power strip of claim 1 wherein at least the first unit or the second unit comprises a generally hollow underside in which the electrical cord may be stored.

5. The power strip of claim 4 wherein the generally hollow underside comprises at least one fastening device selected from the group consisting of clips, clamps, straps, hooks, posts and combinations thereof.

6. The power strip of claim 1 further comprising a surge protector electrically coupled to the plug.

7. The power strip of claim 6 wherein the first unit is electrically connected to the plug by an electrical cord.

8. The power strip of claim 6 wherein the second unit is electrically connected to the first unit by an electrical cord.

9. The power strip of claim 6 wherein at least the first unit or the second unit comprises a generally hollow underside in which the electrical cord may be stored.

10. The power strip of claim 6 wherein the surge protector is selected from the group consisting of single-use melting-metal fuses, self-resetting polymer-based PTC devices, self-resetting ceramic PTC devices, metal-oxide varistors, zener diodes, thyristor-based clamping structures, and combinations thereof.

11. A power strip comprising:

a first unit comprising an electrical outlet, and means for connecting, wherein the first unit is electrically connected to a plug; and a second unit electrically connected to the first unit, the second unit comprising an electrical outlet and means for receiving, wherein the second unit is removably attached to the first unit by cooperation of the connecting means of the first unit and the receiving means of the second unit.

12. The power strip of claim 11 wherein the first unit is electrically connected to the plug by an electrical cord.

13. The power strip of claim 11 wherein the second unit is electrically connected to the first unit by an electrical cord.

14. The power strip of claim 11 wherein at least the first unit or the second unit comprises a generally hollow underside in which the electrical cord may be stored.

15. The power strip of claim 14 wherein the generally hollow underside comprises at least one fastening device selected from the group consisting of clips, clamps, straps, hooks, posts and combinations thereof.

16. The power strip of claim 11 further comprising a surge protector electrically coupled to the plug.

17. The power strip of claim 16 wherein the first unit is electrically connected to the plug by an electrical cord.

18. The power strip of claim 16 wherein the second unit is electrically connected to the first unit by an electrical cord.

19. The power strip of claim 16 wherein at least the first unit or the second unit comprises a generally hollow underside in which the electrical cord may be stored.

20. The power strip of claim 19 wherein the generally hollow underside comprises at least one fastening device selected from the group consisting of clips, clamps, straps, hooks, posts and combinations thereof.

21. The power strip of claim 16 wherein the surge protector is selected from the group consisting of single-use melting-metal fuses, self-resetting polymer-based PTC devices, self-resetting ceramic PTC devices, metal-oxide varistors, zener diodes, thyristor-based clamping structures, and combinations thereof.

* * * * *